2,881,131
ACTIVATED CARBON-PLATINUM-ALUMINUM CHLORIDE HYDROFORMING CATALYST

Kenneth K. Kearby, Cranford, N.J., assignor to Esso Research and Engineering Company, a corporation of Delaware No Drawing. Application December 22, 1953
Serial No. 399,824

1 Claim. (Cl. 208—138)

This invention relates to an improved hydroforming catalyst and to a method for preparing the same. More particularly, the present invention relates to a process for hydroforming petroleum hydrocarbons in the presence of a catalyst composed of active carbon impregnated with a dehydrogenating catalyst such as a platinum group metal and also an isomerizing component such as aluminum chloride.

Hydroforming is generally defined as an operation in which a naphtha, either virgin or cracked, is contacted at elevated temperatures and pressures, in the presence of added hydrogen, with a catalyst for the purpose of improving the anti-knock quality of said naphthas. The process is operated under conditions such that there is no net consumption of hydrogen, and usually there is a net production of hydrogen. The main reactions involved are the dehydrogenation of naphthenes to the corresponding aromatics, the isomerization of paraffins or olefins, the aromatization of paraffins, and the hydrocracking of heavy components of the naphtha. For best results the naphtha feed stock should contain an appreciable quantity of naphthenic hydrocarbons so that the product will contain a substantial quantity of aromatic hydrocarbons. In order to be commercially feasible, the hydroforming operation should result in obtaining a yield of from 81–85% or higher of the original feed. It can thus be seen that in the hydroforming of naphthas a multitude of reactions take place, and that it is essential to obtain an improvement in the characteristics of the naphtha as well as to obtain reasonable yields, which means the formation of a minimum quantity of carbonaceous material and dry gas.

Many different catalysts have been proposed by others for reactions of the above type. The prior art contains disclosures of catalysts used in hydroforming which consist of alumina carrying various oxides of metals of groups V, VI, and VII of transition group elements. Co-precipitated or co-gelled composites containing one or more of the above oxides have also been employed as hydroforming catalysts. However, the most thoroughly investigated hydroforming catalysts have comprised various intimate mixtures of molybdena and alumina or alumina carrying a platinum group metal.

In accordance with the present invention an improved catalyst has been found having a high activity, and this catalyst comprises active carbon impregnated with various dehydrogenating elements and also containing an isomerizing component. In a specific modification of the present invention active carbon is impregnated with platinum and aluminum chloride, the latter being an isomerizing component. Isomerizing components may be used in conjunction with halogen compounds added with the feed or added intermittently with the hydrogen-containing gas fed to the hydroforming zone.

The following examples will serve to illustrate the invention without placing any limitation thereon.

Example I

Activated coconut carbon was freed of impurities by washing with 10% hydrochloric acid solution. The carbon was given three acid washes with sufficient acid to cover the carbon allowing the carbon to stand overnight in the acid. It was washed free of chloride and dried at 400° F. The ash content was 0.41 percent as compared with 1.62 percent for the untreated carbon.

The purified carbon was then impregnated with 0.6–1.2% Pt and 2.0% $AlCl_3$ as follows: 500 cc. of carbon was evacuated and 423 cc. of a solution containing 10.5 grams of platinic chloride added to it. After repeatedly allowing air to the container and re-evacuating for one half hour, the carbon was drained free of excess liquid and dried at 350° F. It was then thoroughly mixed with 7 grams of anhydrous aluminum chloride and was then heated in a stream of dry nitrogen at 900° F. for one hour. It was cooled in nitrogen and stored in a closed container.

Example II

The catalyst described in Example I was used to reform a 207–376° F. naphtha which contained 16% aromatics, 41% naphthenes, and 43% paraffins. This naphtha had a clear Research Octane Number of 56.5. It was passed over the catalyst at a feed rate of 1.02 lbs./hr./lb. catalyst with 2600 cubic feet of added hydrogen per barrel of naphtha. The temperature was 921° F. and the pressure 200 lbs./sq. in. gage. The liquid product had an octane number of 100.

Example III

The catalyst described in Example I was tested under the conditions given in Example II except that .001 percent of $NH_3$ was included in the hydrogen. The amount of $C_1$–$C_3$ dry gas produced was only half that produced in Example II.

Instead of using platinum, other dehydrogenation catalysts such as palladium may be used. Further, palladium, rhodium, iridium and other noble active dehydrogenation metals may be used alone or admixed with platinum. Where activated carbon obtained from coconut shells makes an excellent support for the above hydroforming catalysts, it is pointed out that other carbons may be used, such as the activated cokes derived from the coking of heavy oils or from acid sludges.

It is another feature of the present invention to use mixed catalysts containing relatively large amounts of platinum on only a part of the carbon-aluminum chloride base and mixed with additional base. For example, 5 percent platinum may be put on an activated carbon and mixed with 9 parts of activated carbon and then be impregnated with 0.5 to 5.0 percent of aluminum chloride. Similarly, 5 percent platinum on activated carbon may be admixed with another base such as alumina or silica alumina, but these bases are considered less desirable.

To recapitulate briefly, the present invention relates to the manufacture of new hydroforming and hydrogenation catalysts characterized in that a dehydrogenating component and an aluminum chloride component are supported on an active form of carbon. It has been found that these catalysts have good activity and selectivity and are useful not only for hydroforming of naphthas to improve the anti-knock quality, but also in processes such as the hydrofining of gasoline, desulfurization of sulfur-containing oils, and the simple hydrogenation of unsaturated hydrocarbons.

Many modifications of the above invention may be made by those who are familiar with this art without departing from the spirit thereof.

What is claimed is:

A method for hydroforming naphthas which comprises subjecting a naphtha to elevated conditions of temperature and pressure in the presence of added hydrogen and a catalyst made by acid washing and drying activated carbon, then impregnating the purified and dried carbon with a platinum-containing solution sufficient in amount to deposit up to 1.2% platinum on the activated carbon in the final catalyst product, drying the impregnated activated carbon, then thoroughly admixing anhydrous aluminum chloride with the dried impregnated activated carbon and then heating the mixture at about 900° F. for about one hour to produce a dry catalyst containing up to about 2.0% aluminum chloride.

References Cited in the file of this patent

UNITED STATES PATENTS

| | | |
|---|---|---|
| 2,063,623 | Pier et al. | Dec. 8, 1936 |
| 2,285,277 | Henke et al. | June 2, 1942 |
| 2,600,379 | Doumani et al. | June 17, 1952 |
| 2,739,927 | Doumani | Mar. 27, 1956 |
| 2,762,781 | Nozaki et al. | Sept. 11, 1956 |